United States Patent
Ford

(10) Patent No.: US 9,755,295 B2
(45) Date of Patent: Sep. 5, 2017

(54) ANTENNA CONFIGURED FOR USE IN A WIRELESS TRANSCEIVER

(75) Inventor: James Arthur Ford, Laguna Hills, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 13/461,704

(22) Filed: May 1, 2012

(65) Prior Publication Data
US 2013/0294485 A1    Nov. 7, 2013

(51) Int. Cl.
| | |
|---|---|
| H04K 1/10 | (2006.01) |
| H01Q 1/00 | (2006.01) |
| H01Q 1/24 | (2006.01) |
| H04B 5/00 | (2006.01) |
| H01Q 1/38 | (2006.01) |
| H01Q 21/20 | (2006.01) |
| H01Q 5/40 | (2015.01) |

(52) U.S. Cl.
CPC ............ *H01Q 1/24* (2013.01); *H01Q 1/38* (2013.01); *H01Q 5/40* (2015.01); *H01Q 21/20* (2013.01); *H04B 5/0081* (2013.01)

(58) Field of Classification Search
CPC .... H04B 1/38; H04B 7/0802; H04B 17/0007; H04B 5/0081
USPC .......................................... 375/260; 343/722
See application file for complete search history.

(56) References Cited

U.S. PATENT DOCUMENTS

| | | | | |
|---|---|---|---|---|
| 5,678,171 A * | 10/1997 | Toyama | .................... | H01Q 1/28 342/359 |
| 6,319,668 B1 * | 11/2001 | Nova | .................... | B01J 19/0046 365/183 |
| 6,404,402 B1 * | 6/2002 | Koh | .................... | B81C 1/00404 343/772 |
| 6,424,309 B1 * | 7/2002 | Johnston | .................. | H01Q 9/28 343/725 |
| 6,496,155 B1 * | 12/2002 | Sievenpiper | ............. | H01Q 3/26 343/754 |
| 7,030,453 B1 * | 4/2006 | Agnese | ..................... | G01J 5/08 257/428 |
| 2002/0171601 A1 * | 11/2002 | Puente Baliarda | .... | H01Q 1/246 343/893 |
| 2002/0181208 A1 * | 12/2002 | Credelle | .......... | G06K 19/07749 361/737 |
| 2003/0174092 A1 * | 9/2003 | Sullivan | ................. | H01Q 1/243 343/702 |
| 2004/0266375 A1 * | 12/2004 | Li et al. | ........................ | 455/140 |
| 2005/0052334 A1 * | 3/2005 | Ogino et al. | .................. | 343/866 |
| 2005/0250543 A1 * | 11/2005 | Thermond | ............. | H01Q 1/007 455/562.1 |

(Continued)

*Primary Examiner* — Daniel Washburn
*Assistant Examiner* — Sarah Hassan
(74) *Attorney, Agent, or Firm* — Oblon, McClelland, Maier & Neustadt, L.L.P.

(57) ABSTRACT

The present application discloses various implementations of an antenna configured for use in a wireless transmitter, receiver, or transceiver. In one exemplary implementation, a wireless transmitter includes the antenna configured to be connected to the wireless transmitter. The antenna includes first and second substantially concentric pluralities of antenna elements, the second plurality of antenna elements being rotated with respect to the first plurality of antenna elements. The antenna is configured to enable the wireless transmitter to transmit a communication signal.

20 Claims, 5 Drawing Sheets

(56) References Cited

U.S. PATENT DOCUMENTS

| | | | |
|---|---|---|---|
| 2005/0280588 A1* | 12/2005 | Fujikawa | H01Q 1/242 343/702 |
| 2006/0054710 A1* | 3/2006 | Forster | H01Q 1/22 235/492 |
| 2006/0210279 A1* | 9/2006 | Hillis | B82Y 20/00 398/118 |
| 2007/0122155 A1* | 5/2007 | Hillis | H01Q 3/2676 398/115 |
| 2008/0074329 A1* | 3/2008 | Caballero et al. | 343/702 |
| 2008/0258975 A1* | 10/2008 | Schmidt et al. | 343/700 MS |
| 2008/0307450 A1* | 12/2008 | Kahlman et al. | 720/723 |

\* cited by examiner

ANTENNA CONFIGURED FOR USE IN A WIRELESS TRANSCEIVER

BACKGROUND

Mobile communication devices using wireless transceivers are a technology staple of life around the world. Even in regions of the world where a wired communication infrastructure may be inadequate or absent entirely, mobile communication devices using wireless transceivers are one of the primary enablers of essential communications. Mobile communication devices using wireless transceivers include, by way of specific examples, cell phones, smartphones, sophisticated e-book readers, and tablet computers.

One consequence of the ever increasing popularity of mobile communication devices is the corresponding increased utilization of available bandwidth. As the lower microwave frequencies become more crowded, millimeter wave band frequencies, such as the approximately 57 GHz to 66 GHz frequency range have become attractive for use by consumer electronics. However, as frequencies increase into this range, maximum device powers tend to decrease, as do operating efficiencies, while losses may increase significantly. Consequently, there are substantial challenges to the design of compact, low-power, millimeter wave band wireless transceivers for use in mobile communication devices.

SUMMARY

The present disclosure is directed to an antenna configured for use in a wireless transceiver, as shown in and/or described in connection with at least one of the figures, and as set forth more completely in the claims.

DETAILED DESCRIPTION

Figure 1:
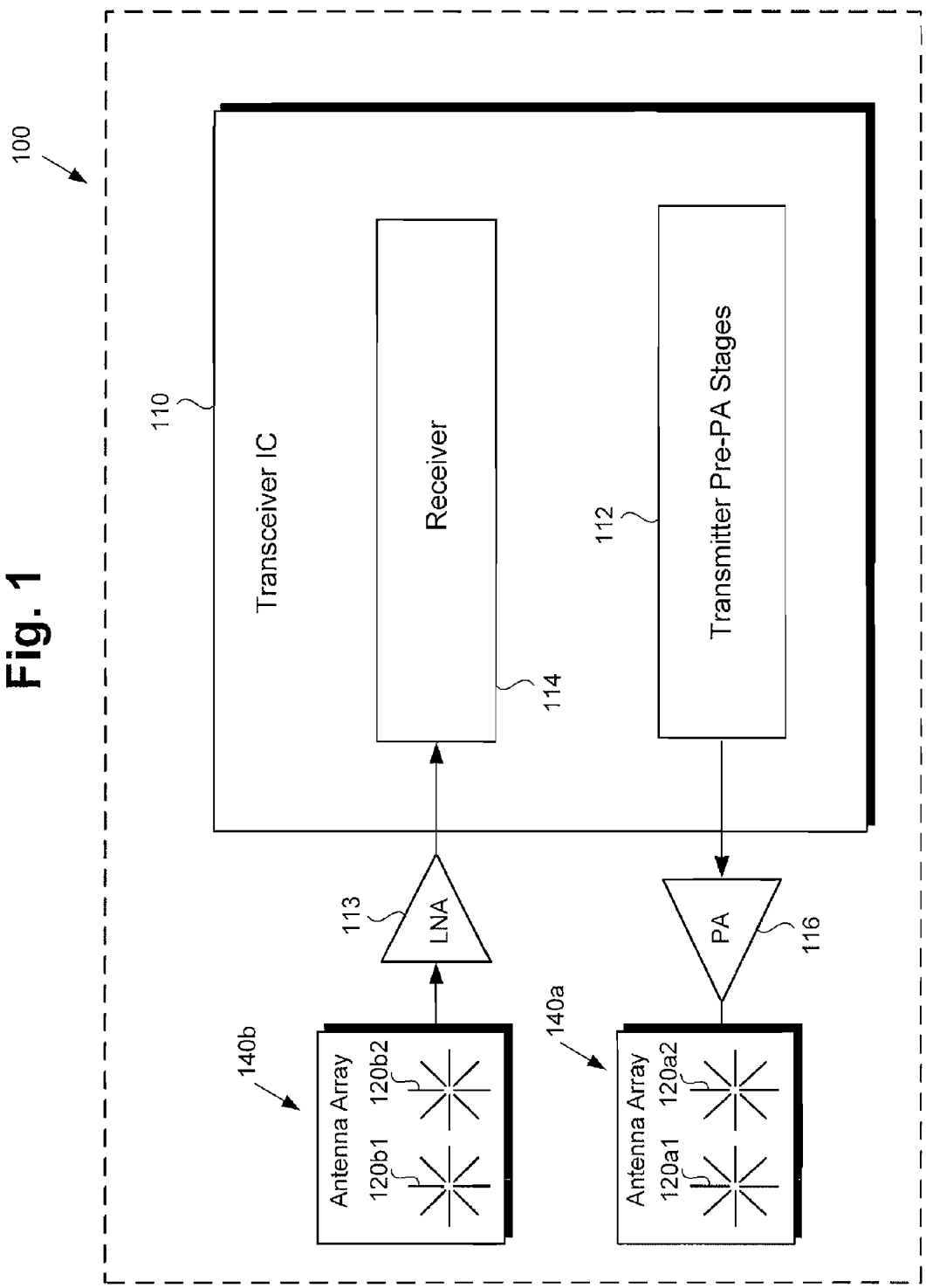
FIG. 1 shows a block diagram of a wireless transceiver including exemplary transmitter and receiver antenna arrays, according to one implementation.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a block diagram of a wireless transceiver 100 including exemplary transmitter and receiver antenna arrays 140a and 140b, respectively, according to one implementation. The transmitter antenna array 140a includes antennas 120a1 and 120a2, each having multiple, substantially concentric, antenna elements. The receiver antenna array 140b includes antennas 120b1 and 120b2, each also having multiple, substantially concentric, antenna elements.

Although the transmitter antenna array 140a is shown to include two antennas, i.e., the antennas 120a1 and 120a2, in other implementations the transmitter antenna array 140a may include more than two antennas. Moreover, in some implementations, a single antenna may be sufficient to support transmission of a communication signal by the wireless transceiver 100. In such implementations, the antenna array 140a may be substituted by a single antenna, such as the antenna 120a1. Similarly, in other implementations, the receiver antenna array 140b may include more than two antennas, or may be substituted by a single antenna, such as the antenna 120b1.

In addition to the transmitter antenna array 140a and the receiver antenna array 140b, the wireless transceiver 100 includes a low-noise amplifier (LNA) block 113, a power amplifier (PA) block 116, and a transceiver integrated circuit (IC) 110. The transceiver IC 110 includes transmitter pre-PA stages 112 coupled to the transmitter antenna array 140a through the PA block 116. The transceiver IC 110 also includes a receiver 114 coupled to the receiver antenna array 140b through the LNA block 113.

It is noted that although not explicitly shown as such in FIG. 1, the transmitter pre-PA stages 112 typically include a digital signal processing (DSP) block and transmit chain processing stages configured to provide preamplification gain control. It is further noted that the receiver 114 typically includes mixer circuitry, as well as one or more filtering stages and a DSP block. Moreover, although the PA block 116 is depicted as a single PA unit, more generally, the PA block 116 may include multiple dedicated PAs corresponding respectively to each of the individual antenna elements of the antennas 120a1 and 120a2. Similarly, the LNA block 113 may include multiple dedicated LNAs corresponding respectively to each of the individual antenna elements of the antennas 120b1 and 120b2.

The wireless transceiver 100 includes a wireless transmitter having the transmitter pre-PA stages 112, the PA block 116, and the transmitter antenna array 140a. The wireless transceiver 100 further includes a wireless receiver having the on-chip receiver 114 and the receiver antenna array 140b. The wireless transceiver 100 may be implemented in a smartphone, cell phone, tablet computer, or an e-book reader. Other exemplary implementations for the wireless transceiver 100 include use in a digital media player, wireless gaming console, or in any other kind of system utilized as a transceiver in modern electronics applications. As a more specific example, the wireless transceiver 100 may be utilized in a tablet computer communicating at millimeter wave band frequencies. That is to say, the wireless transceiver 100 may be configured to support communications at frequencies greater than 50 GHz, such as in a frequency range from approximately 57 GHz to approximately 66 GHz.

Figure 2:
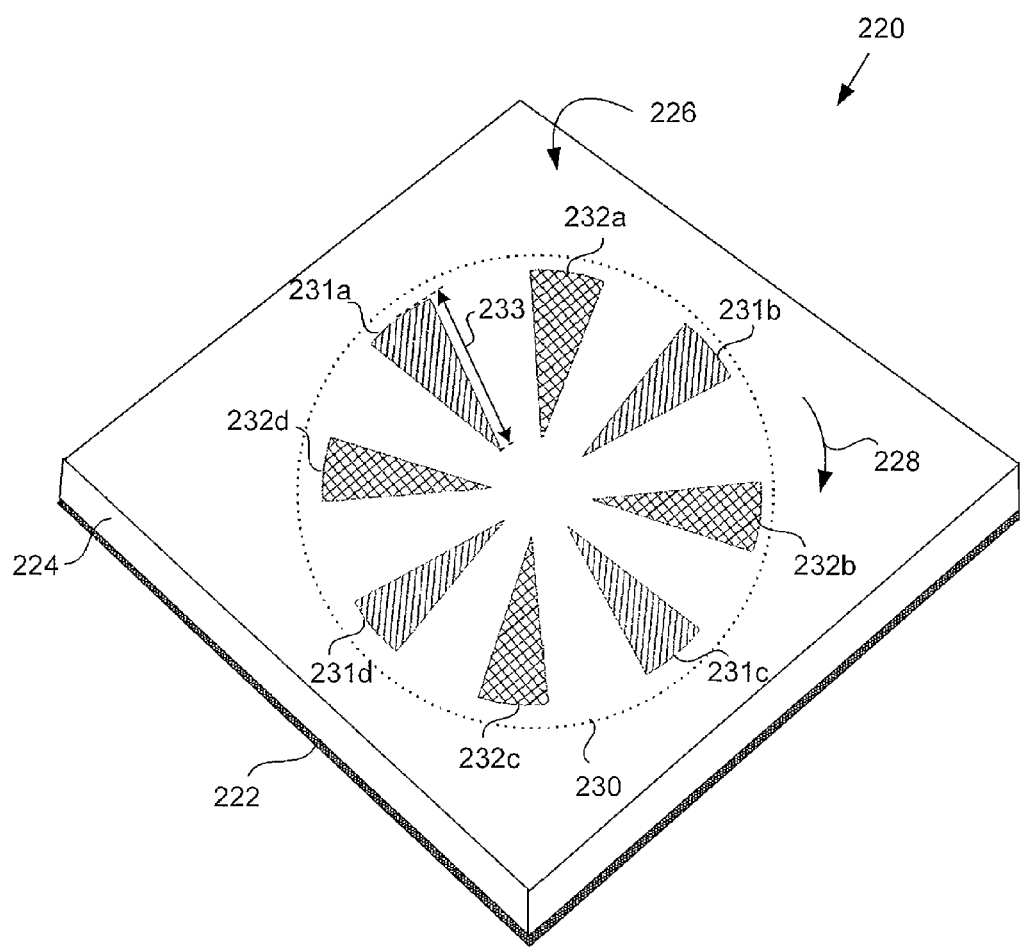
FIG. 2 shows a perspective view of one exemplary implementation of an antenna for use in a wireless transceiver.

Referring to FIG. 2, FIG. 2 shows a perspective view of one exemplary implementation of an antenna 220 for use in a wireless transceiver. The antenna 220 includes a ground plane 222, and a dielectric layer 224 having a top surface 226 disposed over the ground plane 222. The antenna 220 also includes multiple, substantially concentric, antenna elements 230, each having a length 233. The antenna 220 including multiple, substantially concentric, antenna elements 230 corresponds to any of the antennas 120a1, 120a2, 120*b*1, or 120*b*2, in FIG. 1. Thus, the antenna 220 may be implemented as one or both of a transmitter antenna and a receiver antenna. Moreover, the antenna 220 may be implemented as part of one or both of a transmitter antenna array, such as the transmitter antenna array 140*a*, and a receiver antenna array, such as the receiver antenna array 140*b*.

The ground plane 222 may be formed of a thin layer of copper. Other examples of materials suitable for use as the ground plane 222 include essentially any conductive materials utilized in the construction of patch antennas, such as metals and metal alloys. The dielectric layer 224, which is typically much thicker than the ground plane 222, may be formed of a ceramic material, as known in the art. Other examples of materials suitable for use as the dielectric layer 224 include liquid crystal polymers, as well as materials typically utilized as dielectric layers in printed circuit boards (PCBs), such as FR-4.

The multiple, substantially concentric, antenna elements 230 include a first plurality of antenna elements 231*a*, 231*b*, 231*c*, and 231*d* (hereinafter "antenna elements 231*a*-231*d*"). The multiple, substantially concentric, antenna elements 230 further include a second plurality of antenna elements 232*a*, 232*b*, 232*c*, and 232*d* (hereinafter "antenna elements 232*a*-232*d*"). As shown by FIG. 2, the antenna elements 232*a*-232*d* are substantially concentric with the antenna elements 231*a*-231*d*. As further shown by FIG. 2, the antenna elements 232*a*-232*d* are rotated with respect to the antenna elements 231*a*-231*d* through a rotation 228. The rotation 228 may be a clockwise rotation of from approximately five degrees to approximately eighty-five degrees, such as a rotation of approximately forty-five degrees.

The multiple, substantially concentric, antenna elements 230 may be formed of a metal lamina at the top surface 226 of the dielectric layer 224. Such metal laminar elements may be fabricated using any suitable techniques, such as lithographic patterning and etching of a metal film, as known in the art. Due to their thin laminar structure, the multiple, substantially concentric, antenna elements 230 are substantially coplanar with the top surface 226 of the dielectric layer 224. It is noted that although FIG. 2 depicts the antenna elements 231*a*-231*d* and 232*a*-232*d* as numbering eight antenna elements, that representation is provided as an example. In other implementations, the multiple, substantially concentric, antenna elements 230 may include more, or fewer, than eight elements.

As shown in FIG. 2, the multiple, substantially concentric, antenna elements 230 may be formed as three-sided metal laminar elements having the length 233. The length 233 may correspond to a wavelength of the communication signal transmitted and/or received using the antenna 220. For example, in one implementation, the length 233 of the antenna elements 231*a*-231*d* and 232*a*-232*d* may be approximately a quarter wavelength (¼λ) of the communication signal.

In one implementation, the antenna elements 231*a*-231*d* and 232*a*-232*d* may each have two sides of substantially the same length that meet nearer the center of the substantially concentric antenna elements 230, and a third side farther from the center. The two sides having substantially the same length may be substantially straight lines, while the third side joining the two sides having substantially the same length may be straight or curved. Thus, in some implementations, the multiple, substantially concentric, antenna elements 230 may take the form of isosceles triangles or isosceles "pie slice" shaped wedges. However, in other implementations, the multiple, substantially concentric, antenna elements 230 can assume considerably more exotic shapes, such as a flattened spiral or helical shape.

Because of the reductions in maximum device powers and the increases in losses at millimeter waveband frequencies, it is desirable to configure the antenna 220 so as to increase transmission power and reception sensitivity. The antenna 220 can produce these advantages in several ways. For example, when configured as a differential antenna, implementations of the antenna 220 can achieve up to approximately a 6 dB increase in power over a single-ended antenna driven by a comparable PA. In addition, by configuring the antenna 220 to transmit and/or receive a circularly polarized communication signal, implementations of the antenna 220 increase signal immunity to multipath effects. Moreover, by configuring the antenna 220 to enable in-phase (I) and quadrature-phase (Q) signals to combine in free space, the antenna 220 can increase power by approximately an additional factor of two.

A specific example of the operation of the antenna 220 will now be described by further reference to FIG. 2. It is emphasized that the specific details being discussed are part of an exemplary implementation, and are provided with such specificity as an aid to conceptual clarity. According to one implementation, the antenna 220 may be viewed as a substantially concentric collection of differential dipole antennas.

For example, the antenna elements 231*a*-231*d* may correspond to two substantially concentric and perpendicularly disposed differential dipole pairs. The first differential dipole pair may be provided by the differentially driven antenna elements 231*a* and 231*c*, while the second differential dipole pair may be provided by the differentially driven antenna elements 231*b* and 231*d*. The antenna elements 231*a*-231*d* may be driven by a corresponding number of PAs (not shown in FIG. 2), each PA dedicated to driving a respective one of the antenna elements 231*a*-231*d*. As a result, the antenna elements 231*a*-231*d* may be utilized to generate a circularly polarized I component of a communication signal.

Similarly, the antenna elements 232*a*-232*d* may also correspond to two substantially concentric and perpendicularly disposed differential dipole pairs. The first differential dipole pair of the antenna elements 232*a*-232*d* may be provided by the differentially driven antenna elements 232*a* and 232*c*. The second differential dipole pair of the antenna elements 232*a*-232*d* may be provided by the differentially driven antenna elements 232*b* and 232*d*. Like the antenna elements 231*a*-231*d*, each of the antenna elements 232*a*-232*d* may be driven by a dedicated PA (not shown in FIG. 2). As a result, the antenna elements 232*a*-232*d* may be utilized to generate a circularly polarized Q component of the communication signal.

The circularly polarized I and Q components of the communication signal can be generated substantially concurrently by the respective antenna elements 231*a*-231*d* and 232*a*-232*d*. Due to the coaxial, substantially coplanar, and substantially concentric arrangement of the antenna elements 231*a*-231*d* and 232*a*-232*d*, those I and Q components can be combined in free space to produce a quadrature modulated (also referred to as "vector modulated") communication signal. It is noted that the expression "combined in free space" refers to combining the I and Q components in the spatial vicinity of the antenna 220 without need of a waveguide or other additional structural feature. Thus, the antenna 220 may be configured to transmit and/or receive a quadrature or vector modulated, circularly polarized communication signal.

As mentioned above, when implemented to operate as a transmitter antenna, each of the antenna elements 231a-231d and 232a-232d may be individually driven by a dedicated PA. One advantage of such an implementation is that it allows the individual PAs to be spread out on a PA block, such as PA block 116, in FIG. 1, to enhance thermal dissipation. This may be of particular consequence at millimeter band wavelengths, such as those having frequencies of greater than 50 GHz.

When implemented for use as a receiver antenna, each of the antenna elements 231a-231d and 232a-232d may be coupled to a dedicated LNA. The desired signals amplified by the dedicated LNAs are anticipated to be highly correlated. Moreover, the noise produced by the LNAs will typically be substantially uncorrelated. As a result such an implementation utilizing multiple, individually dedicated LNAs can advantageously improve the signal-to-noise ratio (SNR) of a receiver.

Figure 3:
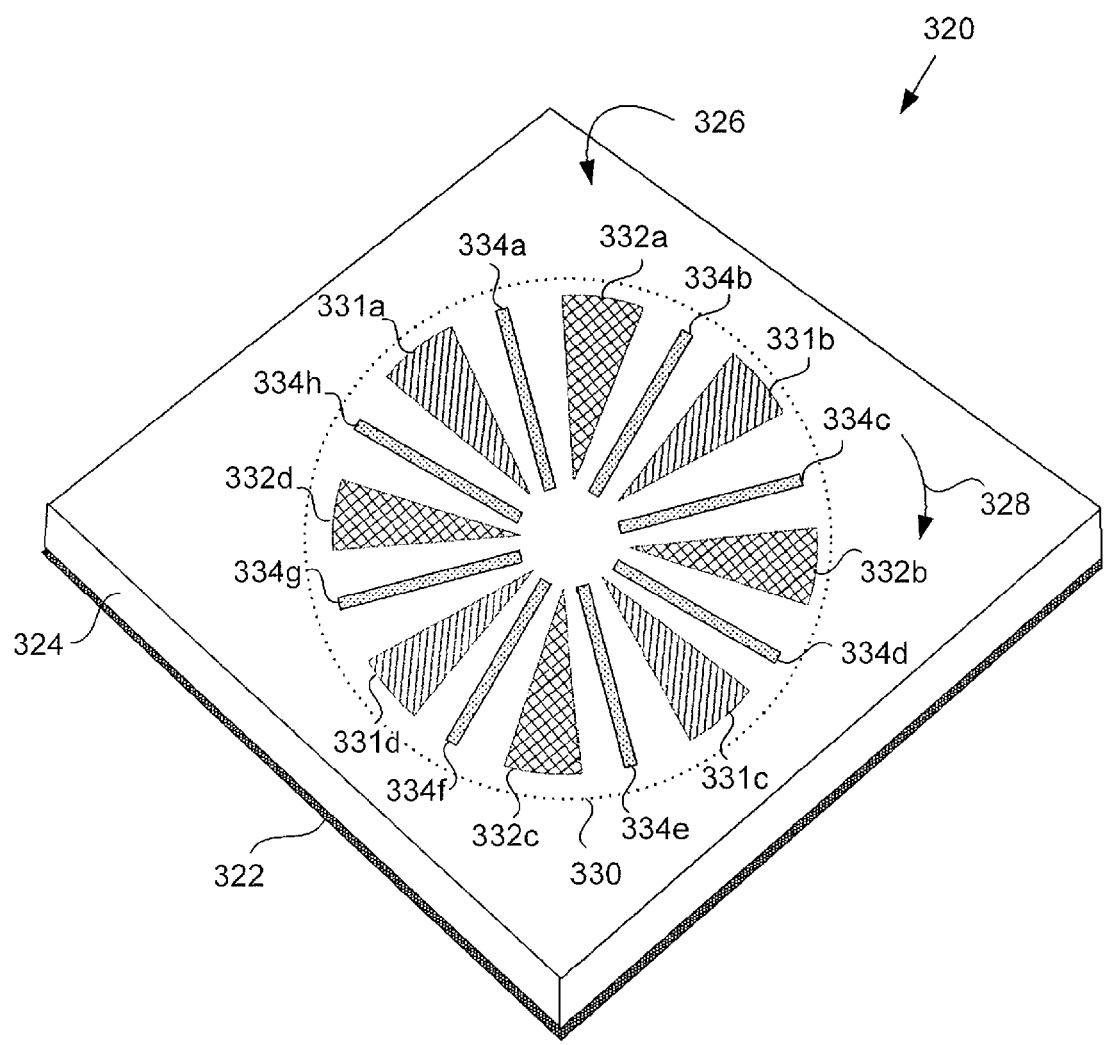
FIG. 3 shows a perspective view of another exemplary implementation of an antenna for use in a wireless transceiver.

Continuing to FIG. 3, FIG. 3 shows a perspective view of another exemplary implementation of an antenna 320 for use in a wireless transceiver. The antenna 320 includes a ground plane 322, and a dielectric layer 324 having a top surface 326 disposed over the ground plane 322. The antenna 320 also includes multiple, substantially concentric, antenna elements 330. The multiple, substantially concentric, antenna elements 330 include antenna elements 331a, 331b, 331c, and 331d (hereinafter "antenna elements 331a-331d") and 332a, 332b, 332c, and 332d (hereinafter "antenna elements 332a-332d"). The multiple, substantially concentric, antenna elements 330 also include interstitial antenna elements 334a, 334b, 334c, 334d, 334e, 334f, 334g, and 334h (hereinafter "interstitial antenna elements 334a-334h"). Also shown in FIG. 3 is a rotation 328 corresponding to the rotation of the antenna elements 332a-332d relative to the antenna elements 331a-331d. The rotation 328 may be a clockwise rotation of from approximately five degrees to approximately eighty-five degrees, such as a rotation of approximately forty-five degrees.

The antenna 320 including the multiple, substantially concentric, antenna elements 330 corresponds to any of the antennas 120a1, 120a2, 120b1, or 120b2, in FIG. 1. Thus, the antenna 320 may be implemented as one or both of a transmitter antenna and a receiver antenna. In addition, the antenna 320 may be implemented as part of one or both of a transmitter antenna array, such as the transmitter antenna array 140a, and a receiver antenna array, such as the receiver antenna array 140b. The ground plane 322, the dielectric layer 324, and the antenna elements 331a-331d and 332a-332d correspond respectively to the ground plane 222, the dielectric layer 224, and the antenna elements 231a-231d and 232a-232d, in FIG. 2. Consequently, the ground plane 322, the dielectric layer 324, and the antenna elements 331a-331d and 332a-332d may have any of the characteristics attributed to their corresponding features above.

The interstitial antenna elements 334a-334h are shown to be substantially concentric with the antenna elements 331a-331d and 332a-332d. In addition, each of the interstitial antenna elements is disposed between adjacent members of antenna elements 331a-331d and 332a-332d. That is to say, interstitial antenna element 334a is disposed between antenna elements 331a and 332a, interstitial antenna element 334b is disposed between antenna elements 332a and 331b, and so forth.

In contrast to the antenna elements 331a-331d and 332a-332d, which may be individually driven elements, as explained above, the interstitial antenna elements 334a-334h may be non-driven elements. In some implementations, the interstitial antenna elements 334a-334h may take the form of conductive bodies, such as laminar metal bodies fabricated substantially concurrently with the antenna elements 331a-331d and 332a-332d. However, in other implementations, the interstitial antenna elements 334a-334h may be fabricated as slots or voids formed in the dielectric layer 324 or the ground plane 322. The presence of the interstitial antenna elements 334a-334h may further enhance the power and sensitivity of the antenna 320 by generating or preventing interactions amongst the antenna elements 331a-331d and 332a-332d. According to the implementation shown by FIG. 3, the interstitial antenna elements 334a-334h are shown as rectangular elements having a length approximately equal to that of antenna elements 331a-331d and 332a-332d. However, in other implementations, interstitial antenna elements 334a-334h may assume other shapes and/or dimensions.

Figure 4:
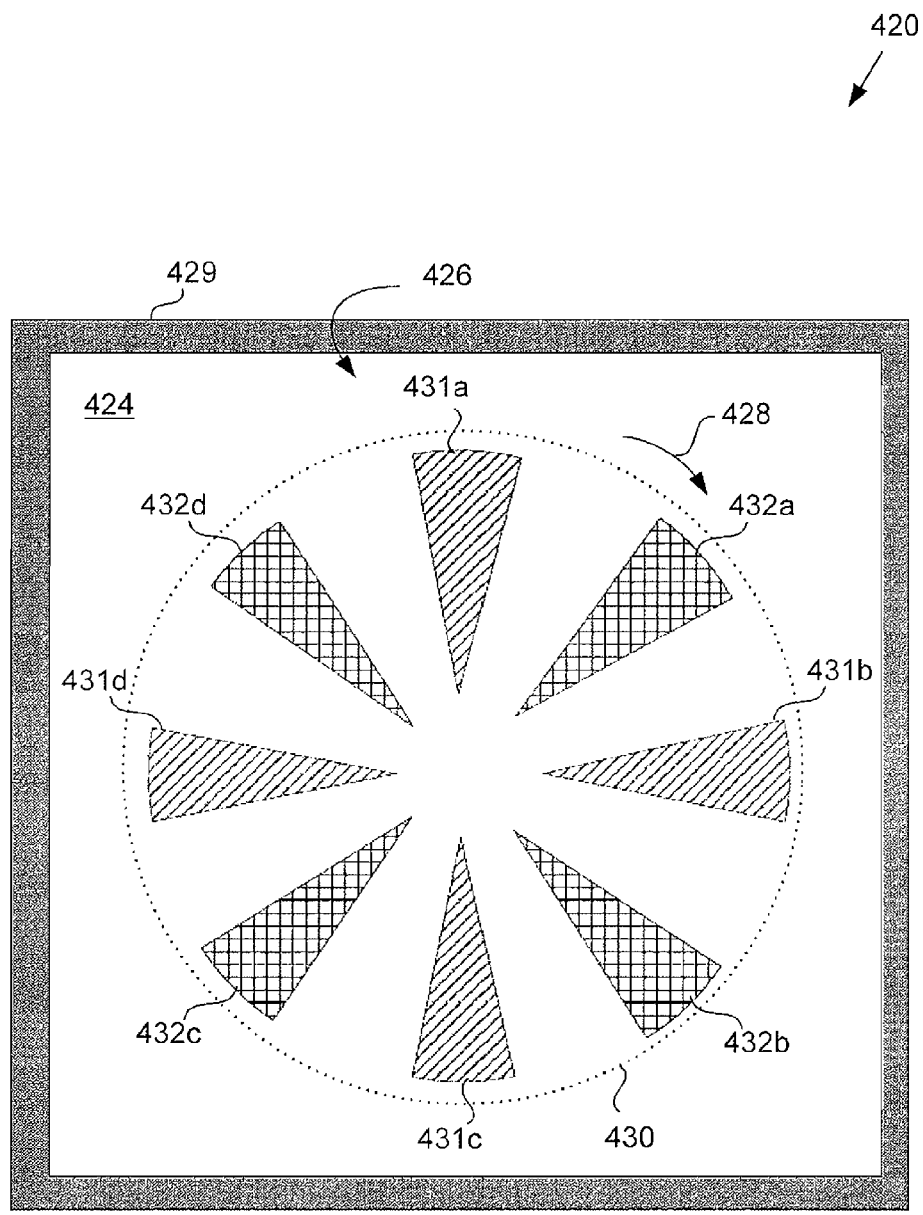
FIG. 4 shows a top view of yet another exemplary implementation of an antenna for use in a wireless transceiver.

Moving to FIG. 4, FIG. 4 shows a top view of yet another exemplary implementation of an antenna 420 for use in a wireless transceiver. The antenna 420 includes a dielectric layer 424 having a top surface 426 upon which are disposed multiple, substantially concentric, antenna elements 430. The multiple, substantially concentric, antenna elements 430 include antenna elements 431a, 431b, 431c, and 431d (hereinafter "antenna elements 431a-431d") and 432a, 432b, 432c, and 432d (hereinafter "antenna elements 432a-432d"). In addition, the antenna 420 includes a high-impedance surface (HIS) 429 absent from the implementations shown by FIGS. 2 and 3.

Also shown in FIG. 4 is a rotation 428 corresponding to the rotation of the antenna elements 432a-432d relative to the antenna elements 431a-431d. The rotation 428 may be a clockwise rotation of from approximately five degrees to approximately eighty-five degrees, such as a rotation of approximately forty-five degrees.

The antenna 420 including multiple, substantially concentric, antenna elements 430 corresponds to any of the antennas 120a1, 120a2, 120b1, or 120b2, in FIG. 1. Thus, the antenna 420 may be implemented as one or both of a transmitter antenna and a receiver antenna. In addition, the antenna 420 may be implemented as part of one or both of a transmitter antenna array, such as the transmitter antenna array 140a, and a receiver antenna array, such as the receiver antenna array 140b. The dielectric layer 424 and the antenna elements 431a-431d and 432a-432d correspond respectively to the the dielectric layer 224 and the antenna elements 231a-231d and 232a-232d, in FIG. 2. Consequently, the dielectric layer 424 and the antenna elements 431a-431d and 432a-432d may have any of the characteristics attributed to their corresponding features above.

The HIS 429 may be fabricated using any suitable known technique, and may be implemented in lieu of a conventional ground plane. As known in the art, the HIS 429 may be fabricated as a textured metal surface, using PCB technology. The HIS 429 conducts direct current (DC) currents. However, the textured design of the HIS 429 is configured to prevent conduction of alternating current (AC) currents in a predetermined band of frequencies. As a result, the HIS 429 can be configured to prevent the propagation of surface waves at or near the communication frequencies supported by the antenna 420. Consequently, use of the antenna 420 including the the HIS 429 may further enhance the performance of a transmitter, receiver, or transceiver including the antenna 420.

Figure 5:
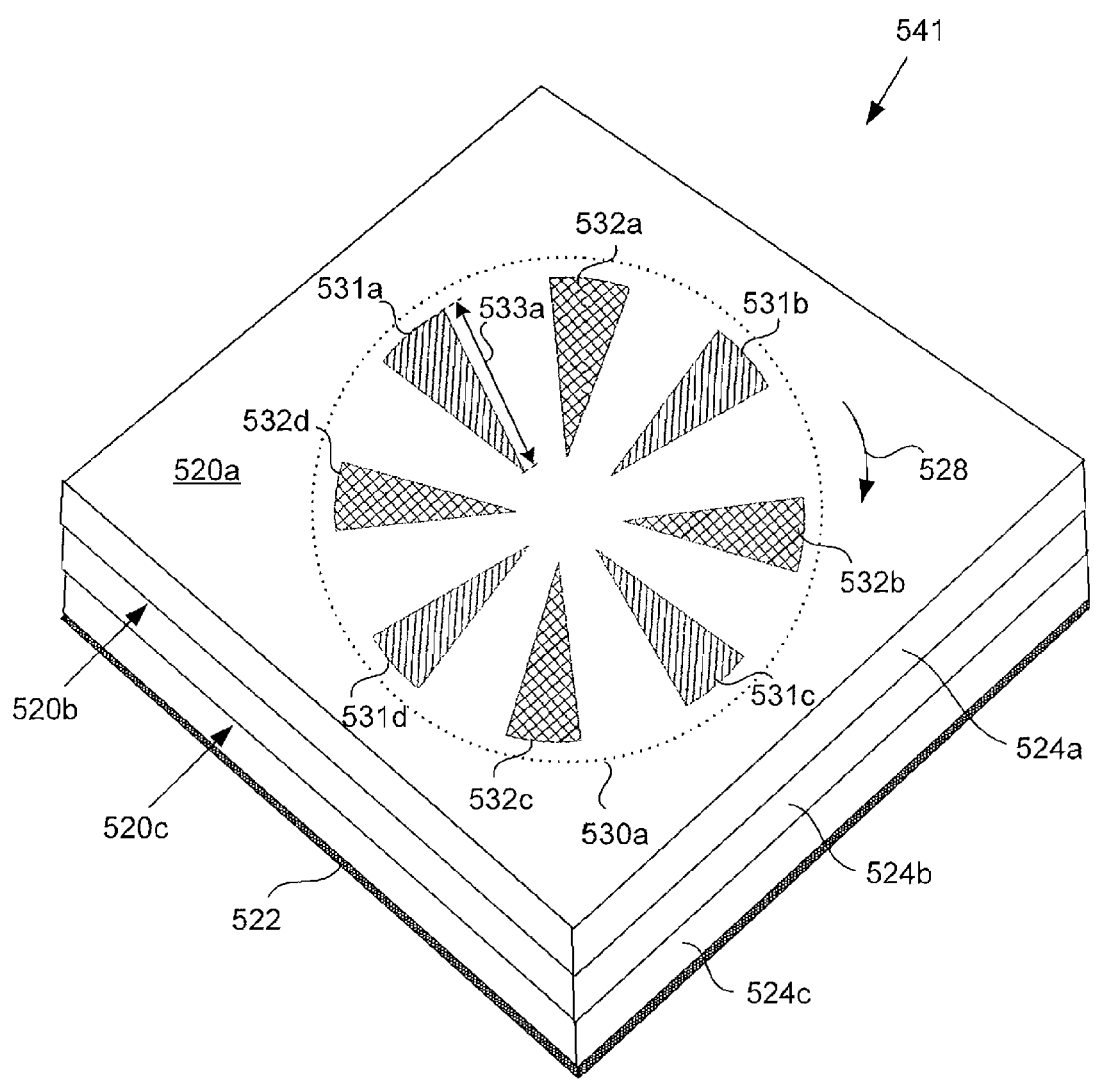
FIG. 5 shows a perspective view of another exemplary implementation of an antenna array for use in a wireless transceiver.

Referring now to FIG. 5, FIG. 5 shows a perspective view of another exemplary implementation of an antenna array 541 for use in a wireless transceiver. The antenna array 541 includes a ground plane 522, and a stack of dielectric layers 524a, 524b, and 524c disposed over the ground plane 522. The antenna array 541 includes an antenna 520a having multiple, substantially concentric, antenna elements 530a disposed on the dielectric layer 524a.

The multiple, substantially concentric, antenna elements 530a include antenna elements 531a, 531b, 531c, and 531d (hereinafter "antenna elements 531a-531d") and 532a, 532b, 532c, and 532d (hereinafter "antenna elements 532a-532d"). Each of the multiple, substantially concentric, antenna elements 530a has substantially the same length 533a. In addition, the antenna elements 532a-532d are rotated with respect to the antenna elements 531a-531d, through a rotation 528. The rotation 528 may be a clockwise rotation of from approximately five degrees to approximately eighty-five degrees, such as a rotation of approximately forty-five degrees.

Although not visible from the perspective of FIG. 5, the dielectric layers 524b and 524c each supports a corresponding substantially concentric arrangement of antenna elements. Thus, the antenna array 541 corresponds to a vertical stack of the antennas 520a, 520b, and 520c, all sharing the ground plane 522 in common.

The antenna array 541 may be implemented as one or both of a transmitter antenna array and a receiver antenna array. In addition, the antenna array 541 may be implemented as part of one or both of a lateral transmitter antenna array, such as the transmitter antenna array 140a, and a lateral receiver antenna array, such as the receiver antenna array 140b. The ground plane 522, the dielectric layers 524a, 524b, and 524c, and the multiple, substantially concentric, antenna elements 530a correspond respectively to the ground plane 222, the dielectric layer 224, and the multiple, substantially concentric, antenna elements 230, in FIG. 2. Consequently, the ground plane 522, the dielectric layers 524a, 524b, and 524c, and the multiple, substantially concentric, antenna elements 530a may have any of the characteristics attributed to their corresponding features above.

In one implementation, the antenna array 540 may be configured as a directional array, such as a Yagi-Uda antenna array. Such an implementation may include the antenna 520b having multiple, substantially concentric, driven antenna elements 530b of length 533b (antenna elements 530b not visible in FIG. 5). For example, in one implementation, the length 533b may be approximately a quarter wavelength (¼λ) of the communication signal supported by the antenna array 541.

In addition, in such an implementation, the multiple, substantially concentric, antenna elements 530c (not visible in FIG. 5) and 530a may have respective lengths 533c and 533a different from one another and different from that of the length 533b. For example, a Yagi-Uda array typically includes one or more non-driven reflector elements having a dimension, e.g., length, greater than a corresponding dimension of the driven antenna element(s). A Yagi-Uda array typically also includes one or more non-driven director elements having a dimension, e.g., length, less than a corresponding dimension of the driven antenna element(s). Consequently, one of the antennas 520a and 520c may be implemented with multiple, substantially concentric, non-driven antenna elements having length 533a/533c greater than the length 533b. Moreover, the other of the antennas 520a and 520c may be implemented with multiple, substantially concentric, non-driven antenna elements having length 533c/533a less than the length 533b.

Thus, the present application discloses an antenna configured to enhance the transmission power and/or reception sensitivity of a wireless transmitter, receiver, or transceiver. By configuring such an antenna as a differential antenna, the solution disclosed by the present application can achieve up to approximately a 6 dB increase in power over a single-ended antenna driven by a comparable PA. In addition, by configuring the antenna to transmit and/or receive circularly polarized communication signals, implementations of the present antenna solution increase signal immunity to multipath effects. Moreover, by configuring the antenna to enable I and Q signal components to combine in free space, the antenna disclosed by the present application can increase power by approximately an additional factor of two.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A wireless transmitter comprising:
at least one antenna comprising:
a dielectric substrate;
first and second coaxial pluralities of triangular antenna elements arranged side-by-side in a circular pattern on the dielectric substrate, said second plurality of triangular antenna elements being interleaved among said first plurality of triangular antenna elements in a circumferential direction of the circular pattern, the first and second pluralities of triangular antenna elements being disposed on a same plane; and
a ground plane on a side of the dielectric substrate that is opposite the first and second coaxial pluralities of triangular antenna elements,
wherein said first and second pluralities of triangular antenna elements are configured to generate a communication signal of said wireless transmitter.

2. The wireless transmitter of claim 1, wherein each of said first and second coaxial pluralities of triangular antenna elements comprises more than two antenna elements.

3. The wireless transmitter of claim 1, wherein said at least one antenna is configured to circularly polarize said communication signal.

4. The wireless transmitter of claim 1, wherein said at least one antenna comprises a differential antenna.

5. The wireless transmitter of claim 1, wherein said at least one antenna further comprises a plurality of interstitial antenna elements coaxial with said first and second pluralities of triangular antenna elements.

6. The wireless transmitter of claim 1, wherein said at least one antenna further comprises a high-impedance surface (HIS).

7. The wireless transmitter of claim 1, further comprising a Yagi-Uda antenna array including said at least one antenna.

8. The wireless transmitter of claim 1, wherein said first plurality of triangular antenna elements is configured to generate an in-phase (I) component of said communication signal and said second plurality of triangular antenna elements is configured to generate a quadrature-phase (Q) component of said communication signal.

9. The wireless transmitter of claim 1; wherein said communication signal has a frequency greater than 50 GHz.

10. A wireless transceiver comprising:
a transmitter, a receiver, and at least one antenna configured to be connected to at least one of said transmitter and said receiver, said at least one antenna comprising:
a dielectric substrate;
first and second coaxial pluralities of triangular antenna elements arranged side-by-side in a circular pattern on the dielectric substrate, said second plurality of triangular antenna elements being interleaved among said first plurality of triangular antenna elements in a circumferential direction of the circular pattern, the first and second coaxial pluralities of triangular antenna elements being disposed on a same plane; and
a ground plane on a side of the dielectric substrate that is opposite the first and second coaxial pluralities of triangular antenna elements,
wherein said first and second pluralities of triangular antenna elements are configured to respectively generate/receive a communication signal for said at least one of said transmitter and said receiver.

11. The wireless transceiver of claim 10, wherein each of said first and second pluralities of triangular antenna elements comprises more than two antenna elements.

12. The wireless transceiver of claim 10, wherein said at least one antenna comprises a differential antenna.

13. The wireless transceiver of claim 10, wherein said communication signal has a frequency greater than 50 GHz.

14. A wireless receiver comprising:
at least one antenna including:
a dielectric substrate;
first and second coaxial pluralities of triangular antenna elements arranged side-by-side in a circular pattern on the dielectric substrate, said second plurality of triangular antenna elements being interleaved among said first plurality of triangular antenna elements in a circumferential direction of the circular pattern, the first and second coaxial pluralities of triangular antenna elements being disposed on a same plane; and
a ground plane on a side of the dielectric substrate that is opposite the first and second coaxial pluralities of triangular antenna elements,
wherein said first and second pluralities of triangular antenna elements are configured to receive a communication signal of said wireless receiver.

15. The wireless receiver of claim 14, wherein each of said first and second pluralities of triangular antenna elements comprises more than two antenna elements.

16. The wireless receiver of claim 14, wherein said at least one antenna comprises a differential antenna.

17. The wireless receiver of claim 14, wherein said at least one antenna is configured to receive a circularly polarized communication signal.

18. The wireless receiver of claim 14, wherein said at least one antenna further comprises a plurality of interstitial antenna elements coaxial with said first and second pluralities of triangular antenna elements.

19. The wireless receiver of claim 14, wherein said communication signal has a frequency greater than 50 GHz.

20. The wireless transmitted of claim 1, wherein the at least one antenna further includes a ground plane and a dielectric disposed on the ground plane, the first and second coaxial pluralities of triangular antenna elements being disposed on the dielectric.

* * * * *